INVENTOR.
GUY H. GOODMAN
BY
Knox & Knox

INVENTOR.
GUY H. GOODMAN
BY
Knox & Knox

Aug. 7, 1962 G. H. GOODMAN 3,048,006
THERMAL CURRENT DRIVEN POWER GENERATING APPARATUS
Filed Dec. 27, 1960 3 Sheets-Sheet 3
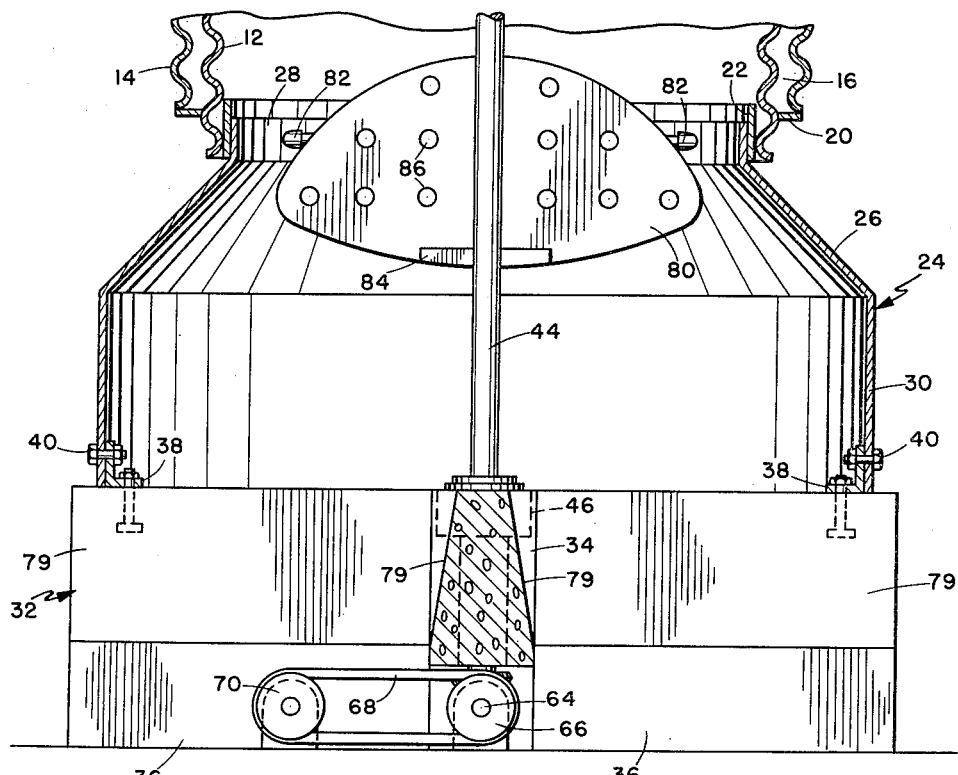
Fig. 4
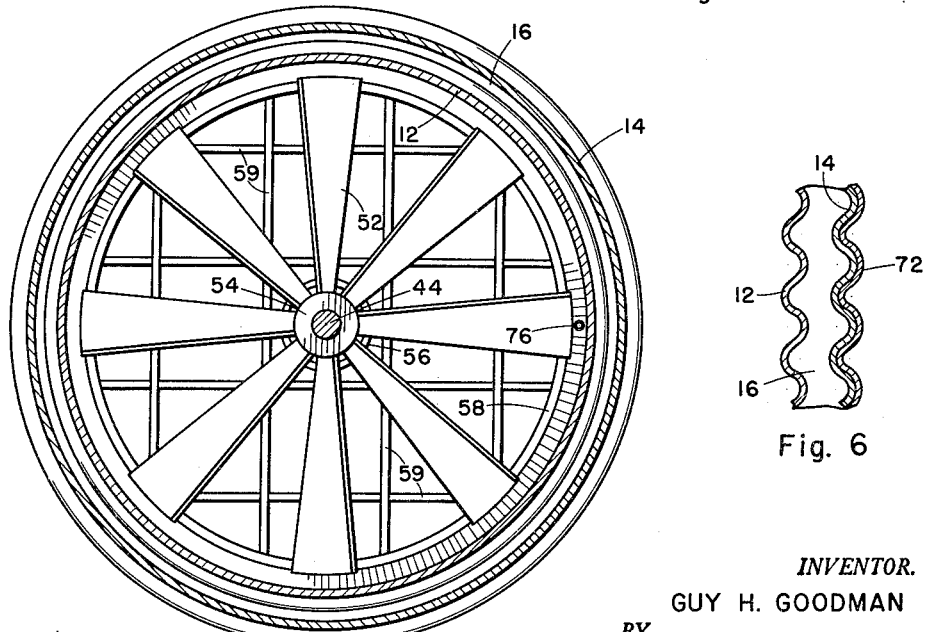
Fig. 5
Fig. 6
INVENTOR.
GUY H. GOODMAN
BY
Knox & Knox 3,048,006
THERMAL CURRENT DRIVEN POWER GENERATING APPARATUS
Guy H. Goodman, 1242 N. Riviera, Anaheim, Calif., assignor of forty-nine percent to Alexander J. E. Beard, Anaheim, Calif.
Filed Dec. 27, 1960, Ser. No. 78,573
9 Claims. (Cl. 60—26)

The present invention relates generally to air driven machines and more particularly to a thermal current driven power generating apparatus.

The primary object of this invention is to provide power generating apparatus having fans driven by a thermal air current induced in a vertical tower, the tower containing heat exchanging means to increase the overall efficiency.

Another object of this invention is to provide power generating apparatus in which the tower is of corrugated, double walled construction having a large heat absorbing surface to collect solar energy and wherein a gas is circulated between the walls and passed through heat exchangers disposed in the air stream to add to the heating of the air.

Another object of this invention is to provide power generating apparatus in which the tower is supported on a substantially open base to allow efficient intake of air and to take advantage of surface winds from any direction which may add to the airflow.

A further object of this invention is to provide power generating apparatus having damping means actuated by the incoming air stream to avoid uneven operation and prevent damage due to sudden gusts or exceptionally strong surface winds.

Finally, it is an object to provide power generating apparatus of the aforementioned character which is simple and convenient to construct and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 4 is a sectional view taken on the line 4—4 of FIGURE 1;

FIGURE 5 is a sectional view taken on the line 5—5 of FIGURE 1; and

FIGURE 6 is an enlarged sectional view of a portion of the tower structure.

Similar characters of reference indicate similar or identical elements and portions throughout the specification and throughout the views of the drawing.

Figure 1:
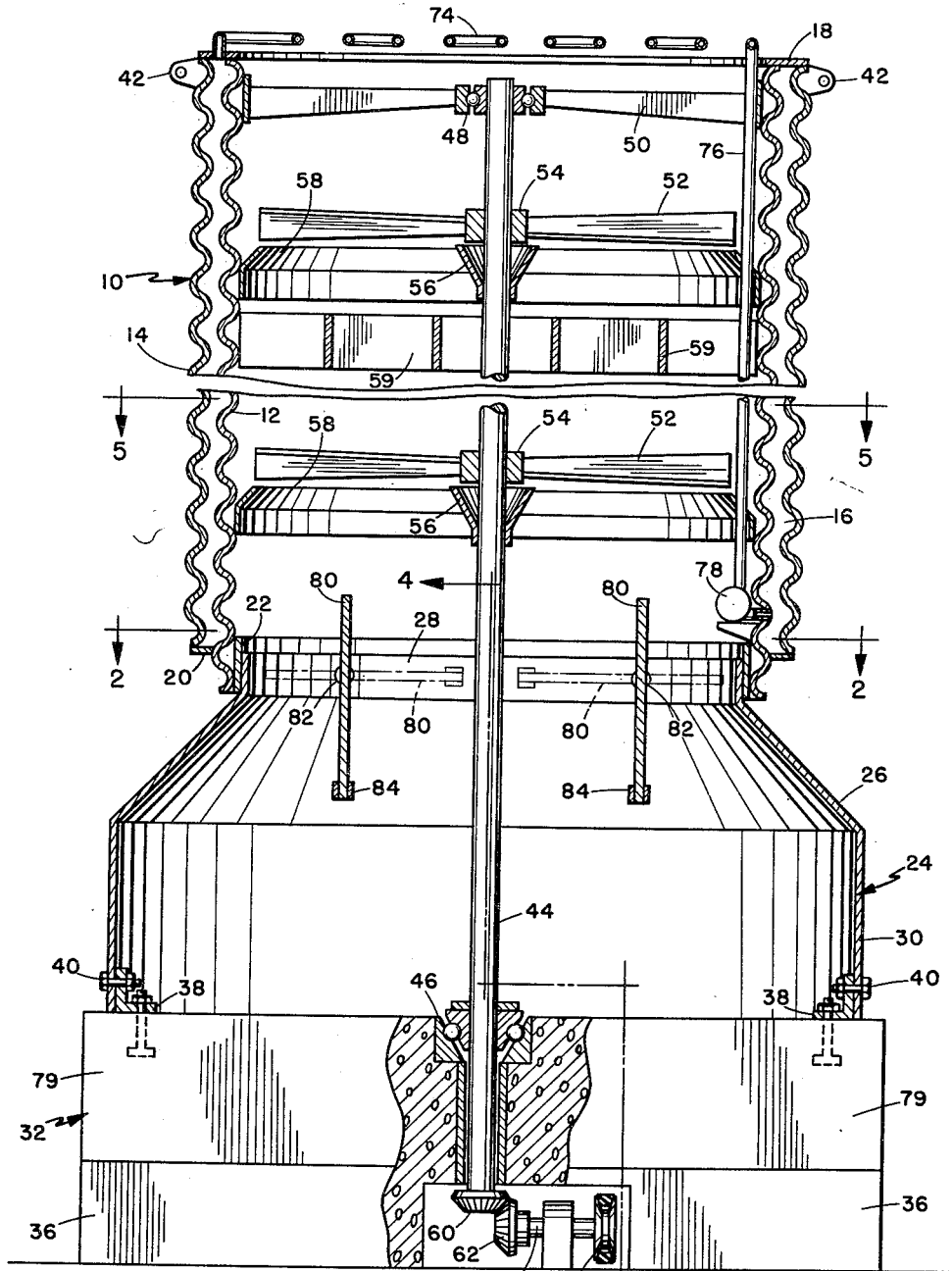
FIGURE 1 is a vertical sectional view of the apparatus.

The apparatus includes a vertical tower 10 comprising an inner shell 12 and an outer shell 14, both of corrugated metal and concentrically spaced to enclose a cylindrical annular chamber 16. At the upper end, the shells 12 and 14 are interconnected and sealed together by a top cap ring 18 and are also connected at the lower end by a lower sealing ring 20, the inner shell 12 extending below the outer shell and being fitted with an internal reinforcing band 22. The tower 10 is mounted on a collector funnel 24 having a conical funnel portion 26 with a top flange 28, which fits inside the reinforcing band 22, and a large, cylindrical intake portion 30 at the lower end. The entire structure may be assembled by welding, bolts, rivets, or other suitable means.

The collector funnel 24 rests on a cruciform base 32 having a central block 34 with extending arms 36. On top of each arm 36 adjacent the outer end is a bracket 38, the cylindrical intake portion 30 being secured to said brackets by suitable bolts 40. If additional support is needed for large size towers, lugs 42 may be fixed to the upper end of the tower for attachment of guy wires. The collector funnel 24 is thus raised above the ground the open configuration of the cruciform base 32 allowing a maximum amount of air to flow into the intake portion 30. The base 32 is, of course, supported and anchored by a suitable foundation, not shown.

Inside the tower 10 is a vertical, axial shaft 44, supported at its lower end in a thrust bearing 46 in the block 34 and held at its upper end in a bearing 48 mounted on a spider 50 attached to the inner sleeve 12. Fixed to the shaft 44 at vertically spaced intervals are multi-bladed fans 52 each having a hub 54, the blade tips having a reasonable clearance from the wall of the inner sleeve 12. Secured to the shaft 44 immediately below each fan 52 is an upwardly diverging, inner deflector cone 56 to deflect air outwardly from the hub 54 onto the fan blades, to minimize losses at the center of the fan. Also below each fan 52 is an inwardly extending, annular deflecting flange 58 fixed to the inner sleeve 12 and disposed to divert air inwardly to the fan blades and avoid losses due to blade tip clearance. Interfan flow straighteners 59 are fixed to sleeve 12.

Power is taken directly from the lower end of the shaft 44, the arrangement illustrated using a bevel gear 60 fixed to the shaft and engaging a second bevel gear 62 on a horizontal drive shaft 64, which carries a drive pulley 66. This drive pulley may be coupled by a belt 68 to a driven pulley 70, as in FIGURE 4, which is connected to drive an electrical generator or other such mechanism in a readily accessible location. Other means for coupling the shaft 44 to the required machinery will be readily apparent and that shown is merely an example.

To absorb a maximum of solar energy, the outer surface of the outer sleeve 14 is coated with a dark substance, such as a bituminous material, indicated at 72 in FIGURE 6. Means are provided for assuring the heating of the air in the interior and upper portions of the tower, this means being illustarted as the annular chamber 16, filled with a gas, such as helium, which, when heated, rises and is fed through heat exchangers grille assembly 74 extending across the upper end of the tower 10. The pipes may be finned for added efficiency if desired. The gas is conveyed from the heat exchanger assembly 74 through a return pipe 76 extending downwardly inside the tower 10 to the lower end of the chamber 16, where a suitable pump 78 may be installed to maintain circulation. Thus the heat absorbed by the gas, in addition to heating the inner sleeve 12 is imparted to the air in the more central portions of the tower through the heat exchanger assembly 74 and the return pipe 76. Added heat exchanger stages and multiple return lines may be used and the heat exchanger assembly may have corresponding units disposed along the length or height of the tower rather than merely at the top.

When the tower is heated, as by solar energy, a rising thermal column of air is induced inside the tower, causing the fans 52 to be rotated and drive the shaft 44. The open structure of the base 32 allows air to flow freely into the collector funnel 24 and enter the thermal column. Also any surface winds tend to be deflected upwardly by the base arms 36 facing the direction of the wind, so boosting the air flow, the upper portions of the arms having sloping faces 79 to improve deflection. The power of a thermal air column is considerable, as evidenced by natural thermals or the vertical currents developed in a thunderstorm.

Figure 2:
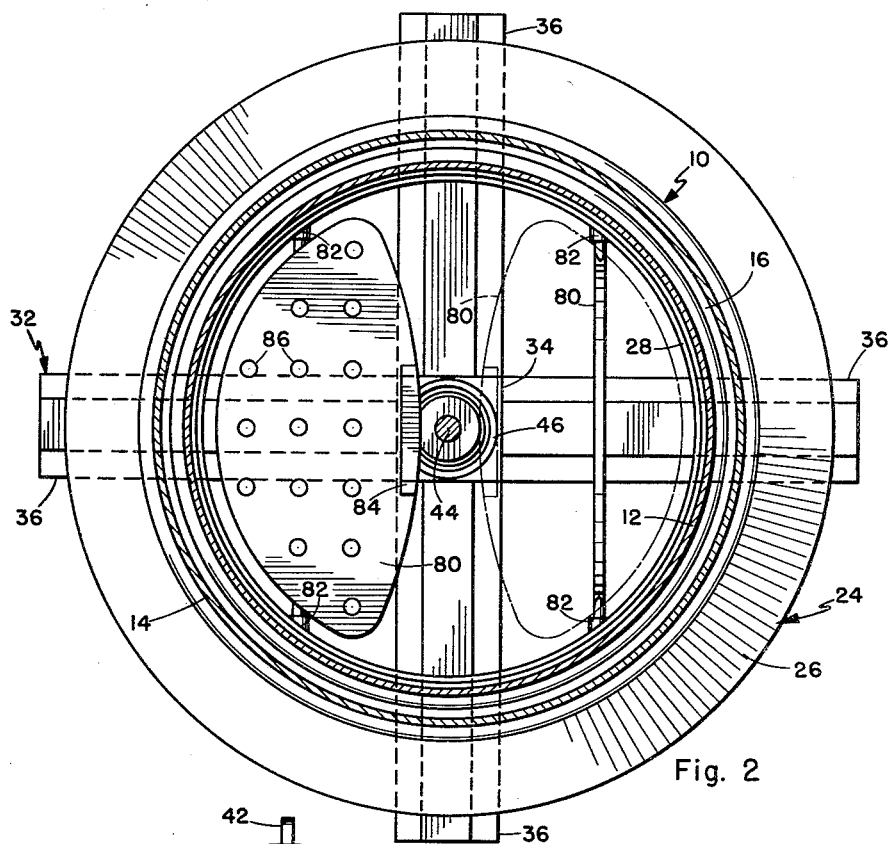
FIGURE 2 is a sectional view taken on the line 2—2 of FIGURE 1, the dampers being represented in closed position.
Figure 3:
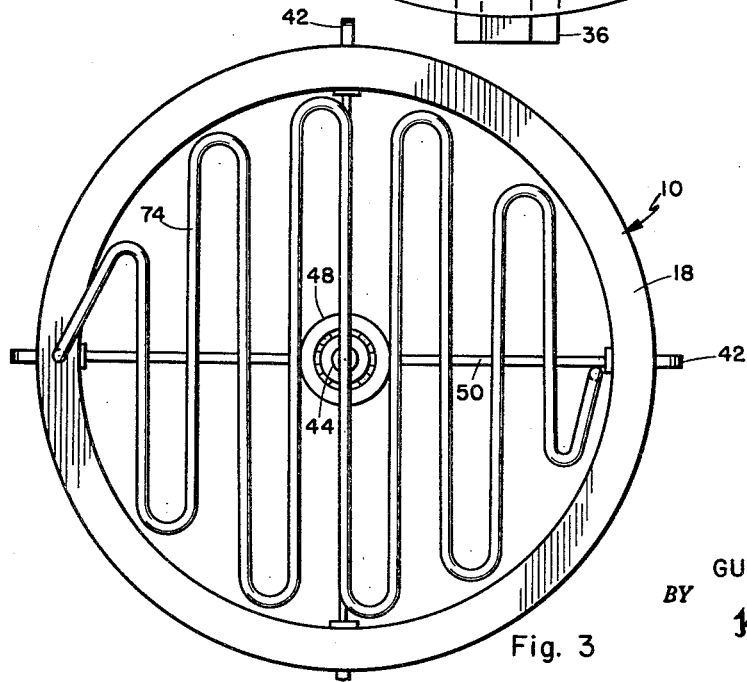
FIGURE 3 is a top plan view of the tower.

To provide means for controlling the fan rotation in the event of very high winds or gusts, the collector funnel 24 is fitted with a pair of dampers 80, each comprising a flat plate shaped to fit into the flange portion 28 and pivotally suspended from opposed bearings 82. The size of the dampers 80 is such that approximately 80% of the area of the tower cross section is obstructed when the dampers are disposed horizontally in the closed position, as indicated in broken line in FIGURE 1 and in full line in FIGURE 2, while in the open position the dampers offer minimum resistance to air flow. To make the dampers self opening, the bearings 82 are offset outwardly so that the major portion of each damper is on one side of the pivotal axis. For additional effect, ballast weights 84 may be fixed to the dampers 80 on the heavy side thereof. To prevent oscillation of the dampers by gusts of wind, each damper 80 is provided with perforations 86, which reduce the effective flat plate area.

In addition to providing power or driving machinery, the apparatus is also useful in circulating local atmosphere. The thermal air flow causes surface currents which circulate air in the vicinity and distribute any pollutants, such as smoke, fog, or the like. A particularly useful application of this feature is in the dispersal of smog in industrial areas.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

1. Thermal current driven power generating apparatus, comprising: an upright tower open at both ends; said tower being double walled and having an inner sleeve and an outer sleeve concentrically disposed and spaced to define an annular chamber; a shaft axially disposed and rotatably mounted in said tower; a plurality of fans fixed to and vertically spaced on said shaft; heat exchanger means operatively coupled to said annular chamber; means to circulate a heat conducting fluid medium through said chamber and said heat exchanger; said heat exchanger being disposed across said tower to add to the heating of air in the internal and upper portions of the tower, whereby the resultant thermal current in the tower causes said fans to rotate; and power take-off means connected to said shaft.

2. Apparatus according to claim 1 and wherein the outer surface of said outer sleeve is coated with a dark, heat absorbent material.

3. Thermal current driven power generating apparatus, comprising: an upright tower open at both ends; said tower being double walled and having an inner sleeve and an outer sleeve concentrically disposed and spaced to define an annular chamber; a shaft axially disposed and rotatably mounted in said tower; a plurality of fans fixed to and vertically spaced on said shaft; airflow deflecting means mounted adjacent the center and the periphery of each of said fans to guide air to the effective portions of the fans; heat exchanger means operatively coupled to said annular chamber; means to circulate a heat conducting fluid medium through said chamber and said heat exchanger; said heat exchanger being disposed across said tower to add to the heating of air in the internal and upper portions of the tower, whereby the resultant thermal current in the tower causes said fans to rotate; and power take-off means connected to said shaft.

4. Thermal current driven power generating apparatus, comprising: an upright tower open at both ends; said tower being double walled and having an inner sleeve and an outer sleeve concentrically disposed and spaced to define an annular chamber; a shaft axially disposed and rotatably mounted in said tower; a plurality of fans fixed to and vertically spaced on said shaft; a collector funnel fixed to the lower end of said tower; said collector funnel having an enlarged intake portion; heat exchanger means operatively coupled to said annular chamber; means to circulate a heat conducting fluid medium through said chamber and said heat exchanger; said heat exchanger being disposed across said tower to add to the heating of air in the internal and upper portions of the tower, whereby the resultant thermal current in the tower causes said fans to rotate; and power take-off means connected to said shaft.

5. Thermal current driven power generating apparatus, comprising: an upright tower open at both ends; said tower being double walled and having an inner sleeve and an outer sleeve concentrically disposed and spaced to define an annular chamber; a shaft axially disposed and rotatably mounted in said tower; a plurality of fans fixed to and vertically spaced on said shaft; a collector funnel fixed to the lower end of said tower; said collector funnel having an enlarged intake portion; a base having a plurality of arms extending from a common center; said collector funnel being fixed to the tops of said arms and spaced above the ground; the greater portion of said base being open to admit air to said intake portion; heat exchanger means operatively coupled to said annular chamber; means to circulate a heat conducting fluid medium through said chamber and said heat exchanger; said heat exchanger being disposed across said tower to add to the heating of air in the internal and upper portions of the tower, whereby the resultant thermal current in the tower causes said fans to rotate; and power take-off means connected to said shaft.

6. Thermal current driven power generating apparatus, comprising: an upright tower open at both ends; said tower having a corrugated inner sleeve and a corrugated outer sleeve concentrically spaced and enclosing an annular chamber therebetween; a shaft axially disposed and freely rotatably mounted in said tower; a plurality of fans fixed to and vertically spaced on said shaft; a collector funnel fixed to the lower end of said tower; said collector funnel having an enlarged intake portion; a substantially open base on which said tower is mounted and spaced above the ground; the outer surface of said outer sleeve being coated with a heat absorbent material, whereby the resultant thermal current in said tower causes said fans to rotate; and power take-off means connected to said shaft.

7. Thermal current driven power generating apparatus, comprising: an upright tower open at both ends; said tower having a corrugated inner sleeve and a corrugated outer sleeve concentrically spaced enclosing an annular chamber therebetween; a shaft axially disposed and freely rotatably mounted in said tower; a plurality of fans fixed to and vertically spaced on said shaft; a collector funnel fixed to the lower end of said tower; said collector funnel having an enlarged intake portion; a substantially open base on which said tower is mounted and spaced above the ground; the outer surface of said outer sleeve being coated with a heat absorbent material, whereby the resultant thermal current in said tower causes said fans to rotate; heat exchanger means coupled to said annular chamber and extending across said tower for exposure to the airflow; means to circulate a heat conducting fluid through said chamber and said heat exchanger means; and power take-off means connected to said shaft.

8. Apparatus according to claim 7 and including damping means in said collector funnel; said damping means comprising substantially flat, plate-like dampers pivotally mounted in the collector funnel and weighted to hang vertically in one position for minimum resistance to the airflow; said dampers being urged by excess airflow to swing upwardly and being dimensioned to obstruct a major portion of the collector funnel in a susbtantially horizontal position.

9. Apparatus according to claim 7 and including flow straighteners fixed to said inner sleeve and disposed between the fans.

References Cited in the file of this patent

UNITED STATES PATENTS

| | | |
|---|---|---|
| 401,516 | Robb | Apr. 16, 1889 |
| 1,294,910 | Hyatt | Feb. 18, 1919 |
| 1,576,373 | Smith | Mar. 9, 1926 |
| 2,544,474 | Swanton | Mar. 6, 1951 |

FOREIGN PATENTS

| | | |
|---|---|---|
| 20,794 | Great Britain | Sept. 19, 1906 |